United States Patent [19]
Walker et al.

[11] Patent Number: 5,977,942
[45] Date of Patent: Nov. 2, 1999

[54] MULTIPLEXED DISPLAY ELEMENT SEQUENTIAL COLOR LCD PANEL

[75] Inventors: Dale S. Walker; Richard M. Knox, both of Houston, Tex.

[73] Assignee: Compaq Computer Corporation, Houston, Tex.

[21] Appl. No.: 08/771,191

[22] Filed: Dec. 20, 1996

[51] Int. Cl.⁶ ........................................... G09G 3/36
[52] U.S. Cl. ........................ 345/97; 345/102; 345/88
[58] Field of Search .......................... 345/102, 87, 89, 345/88, 98, 100, 99, 97, 94, 95, 96, 211, 212, 213, 208, 210; 348/790, 791, 792; 353/77

[56] References Cited

U.S. PATENT DOCUMENTS

| | | | |
|---|---|---|---|
| 4,799,137 | 1/1989 | Aho | 362/309 |
| 4,874,228 | 10/1989 | Aho et al. | 350/345 |
| 5,054,885 | 10/1991 | Melby | 359/618 |
| 5,083,857 | 1/1992 | Hornbeck | 359/291 |
| 5,122,905 | 6/1992 | Wheatley et al. | 359/586 |
| 5,122,906 | 6/1992 | Wheatley | 359/586 |
| 5,148,157 | 9/1992 | Florence | 340/783 |
| 5,190,370 | 3/1993 | Miller et al. | 362/340 |
| 5,225,823 | 7/1993 | Kanaly | 345/89 |
| 5,233,385 | 8/1993 | Sampsell | 355/35 |
| 5,313,479 | 5/1994 | Florence | 372/26 |
| 5,381,309 | 1/1995 | Borchardt | 362/31 |
| 5,404,076 | 4/1995 | Dolan | 313/572 |
| 5,404,171 | 4/1995 | Golstein et al. | 348/459 |
| 5,416,618 | 5/1995 | Juday | 359/53 |
| 5,453,859 | 9/1995 | Sannohe et al. | 359/63 |
| 5,467,146 | 11/1995 | Huang et al. | 348/743 |
| 5,467,154 | 11/1995 | Gale et al. | 353/119 |
| 5,471,584 | 11/1995 | Blaxtan et al. | 359/263 |
| 5,486,949 | 1/1996 | Schrenk et al. | 359/498 |
| 5,504,391 | 4/1996 | Turner et al. | 313/570 |
| 5,508,841 | 4/1996 | Lin et al. | 359/318 |
| 5,523,881 | 6/1996 | Florence et al. | 359/561 |
| 5,555,324 | 9/1996 | Waxman et al. | 382/254 |
| 5,573,324 | 11/1996 | De Vaan | 353/77 |
| 5,606,220 | 2/1997 | Dolan et al. | 313/637 |
| 5,612,820 | 3/1997 | Schrenk et al. | 359/498 |
| 5,626,800 | 5/1997 | Williams et al. | 264/1.38 |
| 5,642,129 | 6/1997 | Zavracky et al. | |
| 5,670,842 | 9/1997 | Dolan et al. | 313/570 |
| 5,682,080 | 10/1997 | Dolan et al. | 313/570 |
| 5,686,793 | 11/1997 | Turner et al. | 313/570 |
| 5,692,820 | 12/1997 | Gale et al. | 353/77 |

OTHER PUBLICATIONS

Gambogi, W.J. et al., "Advances and Applications of DuPont Holographic Photopolymers," Optics Quebec '93, Conf. 2043, "Holographic Imaging and Materials" (Aug. 1993).

Gambogi, W.J. et al., "Color Holography Using DuPont Holographic Recording Films," Proc. SPIE, "Holographic Materials," vol. 2405 (Feb. 1995).

Gambogi, W.J. et al., "Holographic Transmission Elements Using Improved Photopolymer Films," SPIE vol. 1555 Computer and Optically Generated Holographic Optics (Fourth in a Series), pp. 256–266 (1991).

(List continued on next page.)

*Primary Examiner*—Xiao Wu

[57] ABSTRACT

In a color sequential system using LCDs, the LCD must operate faster than the frame rate because red, green, and blue are done sequentially. Ferroelectric LCDs can do this, but they are not analog devices and so cannot provide analog display levels. Instead, a pulse width modulation (PWM) technique is used. In the system of the present invention, each pixel has three storage devices to hold RGB analog levels. A latch is used to load these values in parallel. Then an analog 3:1 multiplexer is used to select the proper storage device for the current sequential color. The multiplexer output goes to a comparator, which has a sawtooth waveform input at much faster than the frame rate. The comparator output changes with the sawtooth level, so that PWM control is provided for each pixel. As an alternative, standard analog LCD pixels can be sequentially switched between three color input storage devices.

14 Claims, 4 Drawing Sheets

OTHER PUBLICATIONS

Gambogi, W.J. et al., "Diffractive Printing Methods Using Volume Holograms," IS&T/SPIE 1993 Int'l Conf. on Electronic Imaging, conf. 1914 (1993).

Handbook of Optics, vol. II, Devices, Measurements, and Properties, "Chapter 3—Polarizers".

Jack M. Younse, "Projection Display Systems Based on the Digital Micromirror Device (DMD)," SPIE Proceedings Reprint, vol. 2641, pp. 64–75 (Jul. 1995).

Joubert, C. et al., "Dispersive Holographic Microlens Matrix for Single LCD Projection."

Larry J. Hornbeck, "Digital Light Processing and MEMS: Timely Convergence for a Bright Future," presented at Micromachining and Microfabrication '95 (Oct. 23–24, 1995).

Parfenov, A.V. and Putilin, A.N., "Advanced Optical Schemes with Liquid Crystal Image Converters for Display Applications," SPIE vol. 2650, pp. 173–179 (Jul. 1996).

Tipton, D. et al., "Improved Process of Reflection Holography Replication and Heat Processing," Proc. SPIE, "Practical Holography VIII, Materials and Processing," vol. 2176 (Feb. 1994).

Weber, A.M. et al., "Hologram Recording in DuPont's New Photopolymer Materials," Practical Holography IV, SPIE OE/Lase Conference Proceedings, 1212–04 (Jan. 1990).

"Chapter 8—Liquid Crystal Displays," pp. 181–251.

"Optics for Image Disposition Systems".

Baur, T. et al., "High Performance Liquid Crystal Device Suitable for Projection Display," SPIE vol. 2650, pp. 226–228 (Jul. 1996).

Displaytech, Inc., "FLC/VLSI Display Technoloy" (Dec. 1, 1995).

Gambogi, W., et al., "HOE Imaging in DuPont Holographic Photopolymers," Proc. SPIE, "Diffractive and Holographic Optics Technology," vol. 2152 (1994).

MULTIPLEXED DISPLAY ELEMENT SEQUENTIAL COLOR LCD PANEL

BACKGROUND OF THE INVENTION

1. Field of the Invention

The present invention relates to color displays using LCDs. More particularly, the present invention relates to sequential color displays which use a novel control system for ferroelectric LCDs.

2. Description of the Related Art

In color displays, there are three major systems for producing different colors and brightness of colors. In the first, a number of pixels are provided, each pixel transmitting either red, green, or blue light. The pixels are arranged in groups of red, green, and blue. A particular color is achieved in an area by turning off or on the appropriate pixels in that area. For example, if purple is the desired color in an area, the green pixels in that area would remain off and the red and blue pixels would be turned on. The brightness is also controlled by turning on or off pixels. If bright purple in an area is desired, then all of the red and blue pixels would be turned on in that area. If a darker purple is desired, then some red and blue pixels would remain off in that area.

In a second system, similar to the first, a number of pixels are also provided, each pixel transmitting either red, green, or blue light. The pixels are again arranged in groups of red, green, and blue, and again, a particular color is achieved in an area by turning off or on the appropriate pixels in that area. However, brightness is controlled by varying the amount of light being transmitted by a pixel which is on, rather than turning off some of the pixels. As in the first system, if bright purple in an area is desired, then all of the red and blue pixels would be turned on in that area. If a darker purple is desired in an area, then rather than having some of the red and blue pixels remain off in that area, all of the red and blue pixels transmit light, but the amount of light being transmitted from each pixel varies. This second system allows for higher resolution than the first system.

Baur, et al., in "High performance liquid crystal device suitable for projection display," SPIE Proceedings, Volume 2650, pages 226–228 (Jan. 29–31, 1996) (incorporated herein by reference), disclose a system similar to this second type in which liquid crystals are used as light valves to alter the polarization of incident light on pixels such that more or less of the light striking the pixels will ultimately be transmitted to a display through a beamsplitter. U.S. Pat. No. 5,453,859 (incorporated herein by reference), issued to Sannohe, et al., discloses another similar system.

A third system for producing a color display with various colors and brightness of colors is commonly known as field sequential color. In a field sequential color system, each pixel transmits, sequentially in time, red, green, and blue light. When the transmission is fast enough, the human brain fuses all three colors of light into a single color, which is a blend of the colors. Color and brightness of color can be controlled in the time domain. For example, if a bluish, purple color is desired from the pixel during a certain time period, the pixel will transmit blue light longer than red light, and it will transmit no green light. Field sequential color is advantageous in that it allows for very high resolution, since each pixel is independent of its neighbors and can assume any color. However, it has limitations which make it a challenge to commercially exploit, including a requirement for extremely high switching rates. This is in part needed to reduce certain undesirable color effects, including rainbows and color flashes associated with moving objects.

LCDs can be used to valve the light transmitted from a pixel in a color sequential system. The LCD must operate at triple the frame rate, because red, green, and blue are done sequentially. Ferroelectric LCDs can do this, but they are binary (on/off), not analog devices, and so they cannot do gray scales with an analog signal input.

DisplayTech, Inc., in a 6-page technical disclosure entitled "FLC/VLSI Display Technology" and dated Dec. 1, 1995 (incorporated herein by reference), discloses a field sequential color system using ferroelectric liquid crystals. In that DisplayTech system, a spatial light modulator (SLM) consists of an array of square pixels organized in rows and columns. Each pixel in the array has a light valve on top of a reflector, and the light valve can be turned on (allowing the light valve to transmit light to the reflector), or the light valve can be turned off (causing the pixel to not transmit light, and thus appear black). The SLM is a very large scale integrated (VLSI) chip that can be a specialized version of a complementary metal oxide semiconductor (CMOS) dynamic random access memory (DRAM) in which each memory cell corresponds to a pixel. The VLSI chip is described as being less than one inch in diagonal size. The light valve is described as a very high speed (100 microsecond switching time) ferroelectric liquid crystal (FLC) in contact with the VLSI chip and which is formed into a thin layer trapped by an overlying window which passes visible light.

By electrically writing image data bits to the DRAM memory cells, images are displayed with the DisplayTech system. The stored charge in each cell impresses a voltage across the FLC to turn it off or on, thus causing light to be transmitted or not from the pixel which the FLC controls.

In the DisplayTech system, color and gray scale is determined in the time domain. The DisplayTech paper discloses that DisplayTech is able to achieve 5-bit gray (31 levels of brightness) by turning the FLC to be on for between zero and 31 time units. However, the DisplayTech paper does not establish how this time is to be established; it appears that each pixel has 15 time periods per frame where it is off or on, and that the FLC can be switched on or off 15 times per frame (5 time periods per color, each time period lasting 1, 2, 4, 8, or 16 time units).

The DisplayTech paper mentions that the basic operation of its FLC/VLSI display requires a relatively large bandwidth of the input video signal which transfers information from the signal source (larger than for analog approaches, it points out).

Bright light sources can be used advantageously in field sequential color systems. One type of light source which is suitable for use in field sequential color systems is a lamp known as a high intensity discharge (HID) lamp. A HID lamp consists of a glass envelope which contains electrodes and a fill which vaporizes and becomes a gas when the lamp is operated. U.S. Pat. No. 5,404,076 (incorporated herein by reference), issued to Dolan, et al., and entitled "Lamp Including Sulfur" discloses an electrodeless lamp utilizing a fill containing sulfur or selenium or compounds of these substances at a pressure at least as high as one atmosphere. The fill is excited at a power density in excess of 50 watts per square centimeter. An arc lamp utilizing the fill at a pressure at least as high as one atmosphere is excited at a power density of at least 60 watts per square centimeter. This lamp could advantageously be used with field sequential color systems.

Parfenov, et al., in "Advanced optical schemes with liquid crystal image converters for display applications," SPIE Proceedings, Volume 2650, pages 173–179 (Jan. 29–31, 1996—incorporated herein by reference), disclose additional background information on the use of liquid crystal devices to process video images.

SUMMARY OF THE INVENTION

The present invention comprises a color sequential system which uses FLCs controlled by analog voltage signals which are converted to time duration signals.

The FLCs act as light valves for the pixels of the present invention. Each pixel has three analog storage devices, one each to hold red, green, and blue analog levels. In one embodiment, these devices are capacitors. A latch is used to load these analog levels in parallel, and then the RGB color sequencing is repeated many times during a frame. An analog 3:1 multiplexer (mux) is used to select the proper storage device for a color to be displayed. The mux output goes to a comparing device, which also receives a sawtooth voltage signal with a period equal to the RGB color sequencing color period. The comparing device, such as a comparator, output changes with the sawtooth level, so that pulse width modulation (PWM) control is provided for each color for each pixel.

Prior co-pending U.S. patent application Ser. No. 08/581,108, entitled "Projecting Images," to Knox, filed Dec. 29, 1995 (incorporated herein by reference), discloses a method of displaying an optical image by projecting the image along an optical path and at an optical device interposed across the optical path, at one time reflecting the image from the optical device and at a different time permitting the image to pass through the optical device to be displayed. The image-forming ferroelectric LCD device of the present invention could be used as an image engine in the method disclosed in that patent application.

The present invention also includes a system with a computer and a display which includes the display controller disclosed. Likewise, the present invention could include a television using the display controller disclosed. The display apparatus could comprise a desktop computer, with the computer being the means for providing an input video signal and the computer monitor comprising the display means.

The means for sequentially selecting the first, second, and third capacitors of each controller for the FLCDs is preferably a multiplexer. The light source means preferably comprises a switchable color filter electrically connected to a triple clock rate counter on a synchronized rotating series of three color filters.

The sawtooth voltage input signal can use many variations, such as a rising or falling sawtooth signal; a gamma-corrected sawtooth shaped signal; a falling sawtooth shaped signal having a different gamma-corrected waveform corresponding to each light color, or an alternating rising and falling signal. Further, in another embodiment, a multiplexer is used to provide analog RGB video levels to an analog LCD for use with field sequential color.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
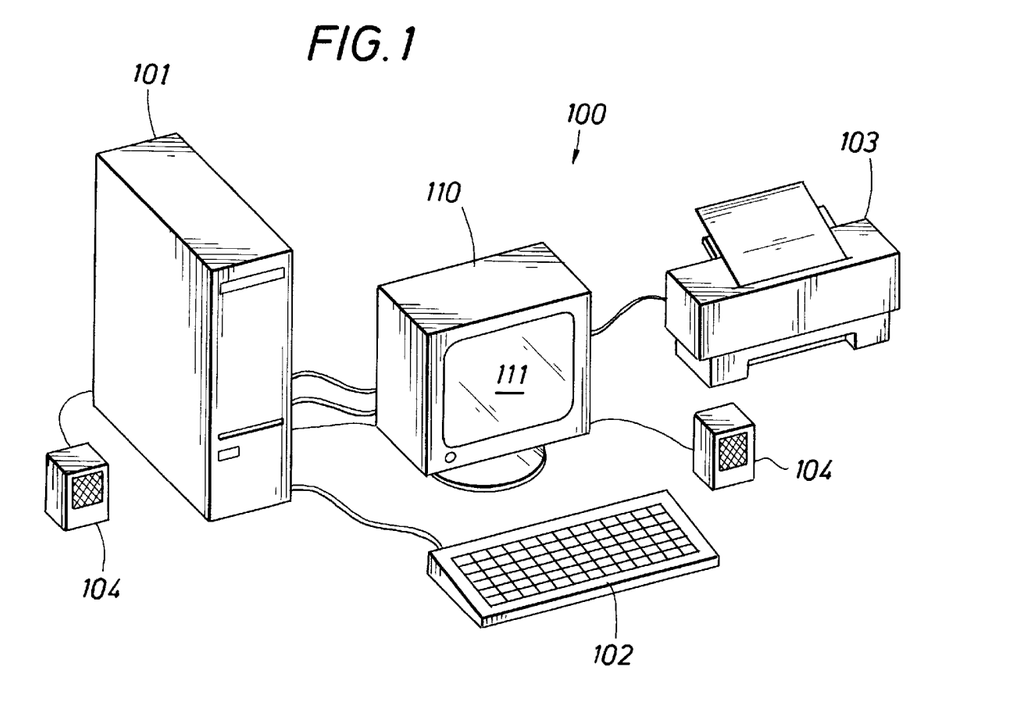
FIG. 1 is a perspective view of a computer system in which the display controller according to the present invention can advantageously be used.
Figure 2:
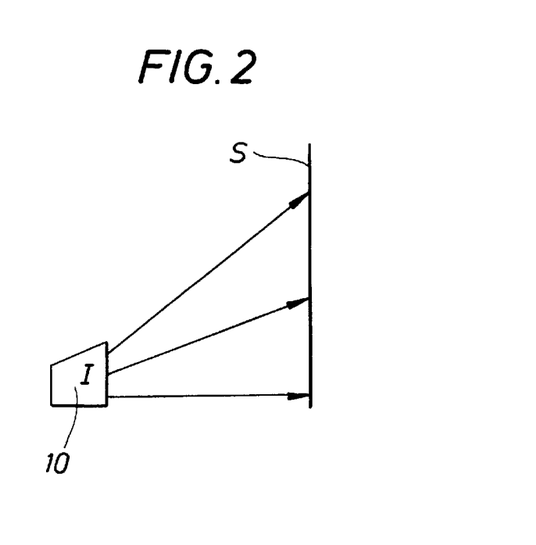
FIGS. 2 and 3 are side, partially cut-away views of alternative embodiments in which the techniques according to the invention could be implemented.
Figure 3:
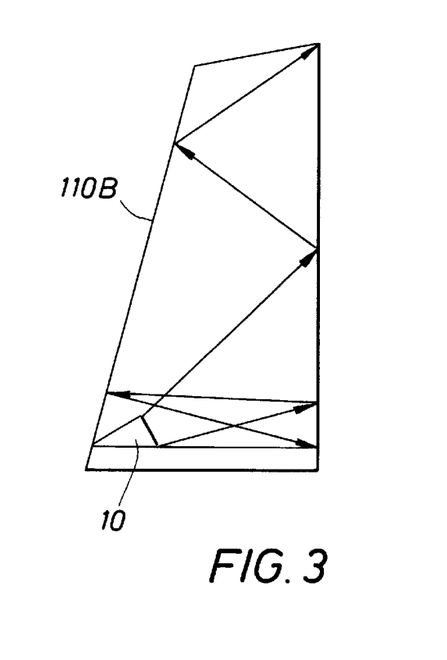

FIG. 1 shows a computer system 100 with which the color display control apparatus of the present invention may advantageously be used. The computer system 100 includes a central processing unit (CPU) 101, a computer monitor 110, a keyboard 102, a printer 103, and speakers 104. The computer monitor 110 includes a screen 111 (see FIGS. 1 and 3) and an image source 10 for projecting light onto the screen 111. Preferably, the computer monitor 110 is a compact monitor 110B as described below in conjunction with FIG. 3. Such a monitor, which requires a polarized image, is further described in copending U.S. application Ser. No. 08/581,108, entitled "Projecting Images," to Knox, filed Dec. 29, 1995, and incorporated herein by reference. The image source 10 is shown in more detail in FIG. 4. FIG. 2 illustrates a projection-based system with the image engine I and a screen S, also suitable for use with the invention.

Figure 4:
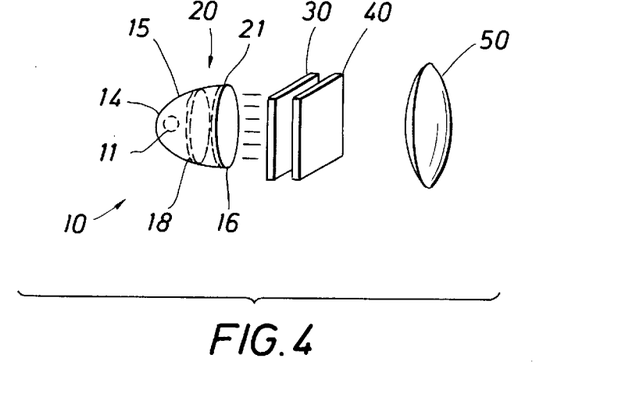
FIG. 4 is an elevational side view of basic components of the one embodiment of the apparatus of the present invention.

The image source 10 includes a light source 20, a switchable color filter 30, a ferroelectric LCD panel 40, and a lens 50. Though the switchable color filter 30 is shown between the light source 20 and the color ferroelectric LCD panel 40, it could instead be placed between the sequential color ferroelectric LCD panel 40 and the lens 50.

The light source 20 can advantageously be a highly efficient source of light, such as the light sources disclosed in U.S. Pat. No. 5,404,076.

A shaped (e.g., parabolic) annular reflector housing 14 is positioned about and spaced from bulb 11 as shown in FIG. 4. The housing 14 is hollow, defined by a wall 15 and an open end portion 16. The wall 15 has a reflecting surface that can be parabolic in section as shown in FIG. 4. A first transversely positioned filter 18 is interposed across the path of light beams that are travelling from the bulb 11 through the open end portion 16. A second filter 21 is interposed on the opposite side of filter 18 from bulb 11 as shown in FIG. 4.

The first filter 18 is preferably an interference filter such as a dichroic filter or dichroic mirror, that reflects certain colors of light while allowing others to pass through. The filter 18 is preferably selected to pass red, green and blue light, reflecting undesired light back to the bulb 11 and the reflector surface 17. By reflecting light other than red, green, and blue for example back to the bulb 11, the light source 20 becomes more efficient if it is of a type that reabsorbs and retransmits light. Such a light source is described in U.S. patent application Ser. No. 08/747,190, entitled "High Efficiency Lamp Apparatus for Producing a Beam of Polarized Light," to Knox, filed Nov. 12, 1996. Therefore, the filter 18 reflects back and "recycles" unwanted light wave lengths. In FIG. 4, the light source 20 has the filter 18 mounted inside the reflector housing 14 and the filter 21 mounted at the opening 16. The filter 18 and the filter 21 each extends at its periphery to the wall 15.

The filter 21 is a reflective polarizer that only allows a certain polarity of light to pass through. The filter 21 reflects light of unneeded polarity back to the bulb 11. Therefore, in the light source 20, emitted light has been filtered to be of desired portions of the color spectrum and of a desired polarity. Filters 18 and 21 are optional. Filter 21 may be omitted if light of a particular polarity is not needed in the display system in which the image source 10 is used. Screen 18 may be omitted if inexpensive apparatus is more important than efficiency.

Figures 5, 6:
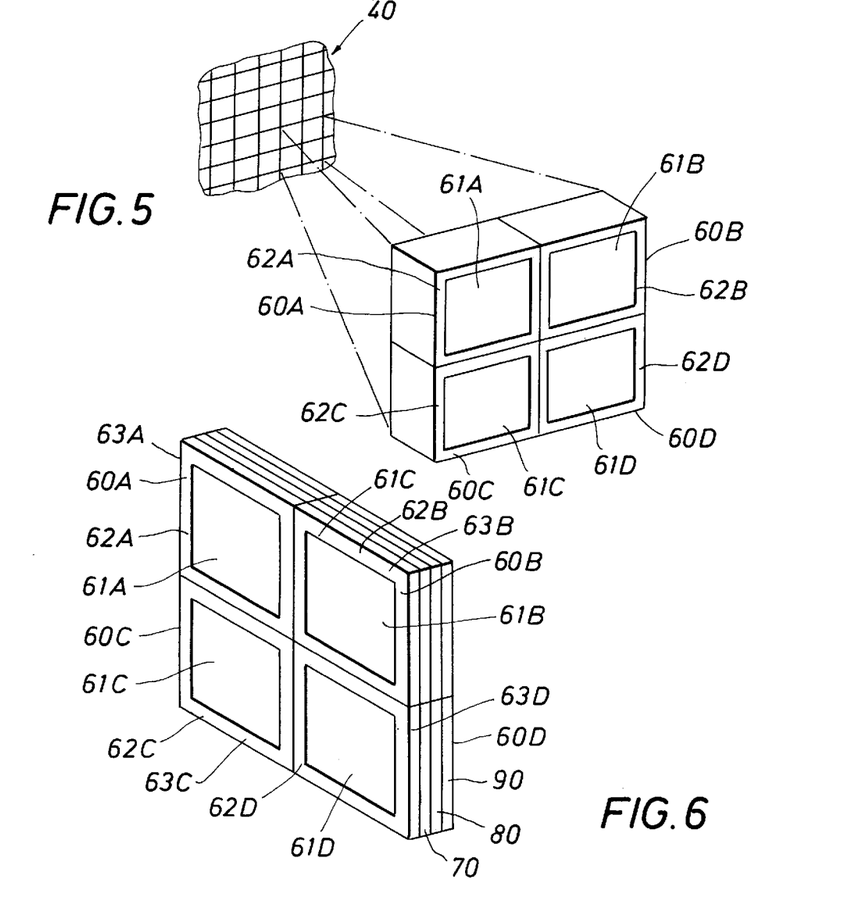
FIG. 5 is an enlarged view of a portion of the light valve panel of the present invention.
FIG. 6 is a detail showing various layers of the light valve panel of the present invention.

The color ferroelectric LCD panel 40 is shown in more detail in FIGS. 5 and 6. The color ferroelectric LCD panel 40 is made up of a plurality of pixels, four of which are designated as pixels 60A, 60B, 60C, and 60D in FIGS. 5 and 6. Each pixel includes a ferroelectric LCD (FLCD), and four are shown as FLCDs 63A, 63B, 63C, and 63D in FIG. 6.

Each FLCD 63A, 63B, 63C, and 63D includes a transmissive region, 61A, 61B, 61C, and 61D, respectively, and a non-transmissive region, 62A, 62B, 62C, and 62D, respectively. Preferably, the transmissive regions 61A, 61B, 61C, and 61D are maximized and the non-transmissive regions 62A, 62B, 62C, and 62D are minimized.

A switchable color filter which can advantageously be used as the filter 30 can be obtained from DisplayTech Company. Alternatively, a rotating disk of red, green, and blue filters (or other suitable three complementary colors) can form the filter 30.

Figure 7:
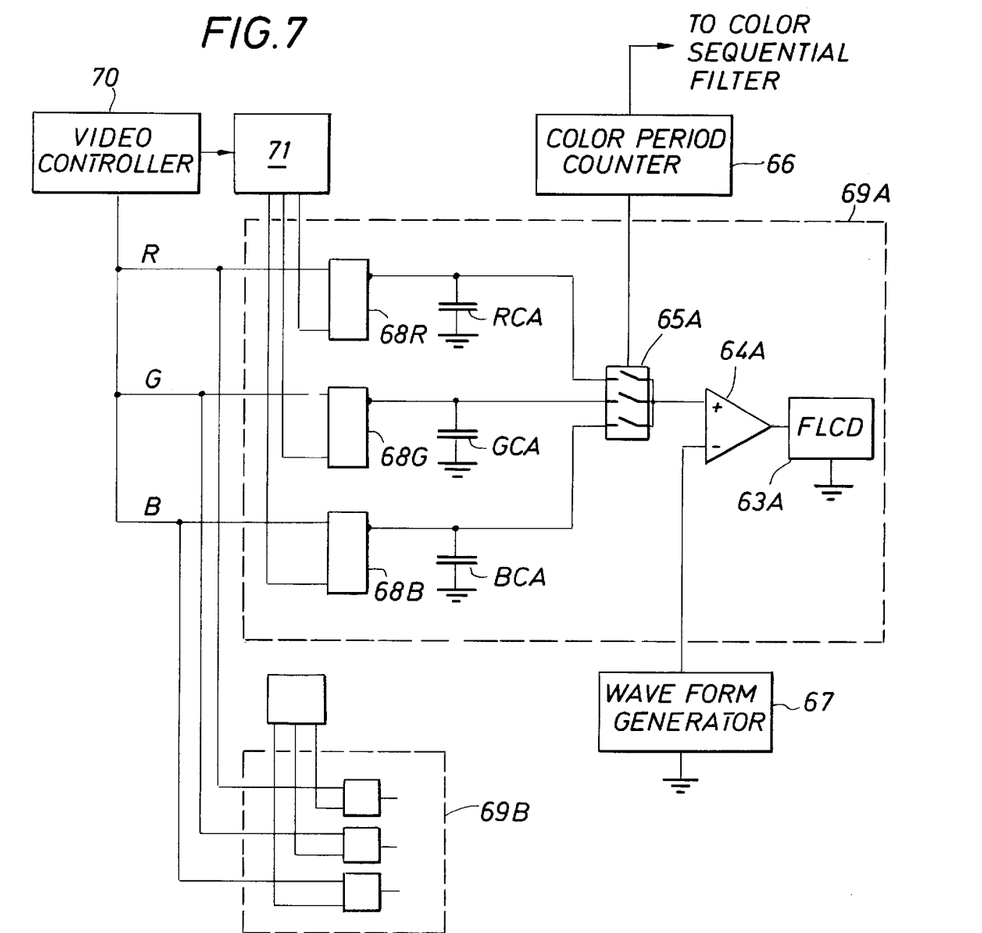
FIG. 7 is a schematic diagram showing the electronics controlling the ferroelectric liquid crystal devices of the present invention.

Turning now to FIG. 7, the electronics for controlling the FLCD 63A are shown. These control electronics include a first analog storage device (here a capacitor) RCA for storing an analog signal voltage representing the red light to be transmitted from pixel 60A, a second capacitor GCA for storing an analog signal voltage representing the green light to be transmitted from pixel 60A, a third capacitor BCA for storing an analog signal voltage representing the blue light to be transmitted from pixel 60A, a multiplexer 65A, a comparator circuit 64A, a waveform generator 67, and a color period counter 66. Similar electronics are used for the other FLCDs, though one color period counter 66 and one waveform generator 67 can be shared among the various pixels. The circuitry needed for each pixel is illustrated as the circuitry block 69A. The circuitry block 69A is repeated for each pixel, as is illustrated by block 69B. Further, analog switches 68R, 68G, and 68B pass the analog levels from RGB video lines generated by a video controller 70. These switches 68 are appropriately turned on and off responsive to row and column decode circuitry 71. The counter 66 is preferably much faster than three times the screen refresh rate, where typical screen refresh rates range from 60 to 72 Hz.

The capacitors RCA, GCA, and BCA, the multiplexer 65A, the comparator 64A, the FLCD 63A, and the switches 68 are all preferably constructed on the LCD panel 40. This can be done using a variety of techniques. Because LCD panels for projection systems can be very small, such spatial light modulators lend themselves to integrated circuit fabrication techniques. For example, the drive transistors for an active LCD can be deposited underneath each ultimate pixel location on a silicon chip, and then a fresh reflective surface deposited over those electronics. In this way, the reflector also has its own electronics. But while these LCDs are relatively small, they are large for integrated circuit chips, so abundant space is available for rather sophisticated electronics for each pixel, such as the circuitry block 69A. Therefore, the various circuitry can be deposited on a silicon or other chip, near each ultimate pixel location, and then a reflective layer deposited on the surface.

The switches 68 load the analog signal voltages in capacitors RCA, GCA, and BCA in parallel. The analog signals used to provide voltages for the capacitors RCA, GCA, and BCA are standard analog signals provided by video controllers. Typically, video controllers include a digital-to-analog converter (DAC) which receives a digital representation of the color for each pixel. That digital representation is then converted to three analog signal levels and provided to whatever video display is being used. In this case, that analog signal is provided to each of the capacitors RCA, GCA, and BCA.

In operation, analog signal voltages are applied to capacitors RCA, GCA, and BCA at the rate at which frames are to be displayed on the screen 111 of the computer monitor 110 (typically between 60 and 80 Hz). The waveform generator 67 produces a sawtooth waveform W2 (see FIG. 8) which preferably peaks at the color period rate, which is preferably much faster than triple the frame rate. The sawtooth waveform W2 is fed to one input of the voltage comparator circuit 64A. The color period counter 66 signals to the multiplexer 65A to switch the positive input of the voltage comparator circuit 64A to the capacitor RCA for first color period, then to the capacitor GCA for the next color period, and then to the capacitor BCA for the last color period. At the same time, the color period counter 66 signals to the color sequential filter 30 to pass red light to the pixels for first color period, then to pass green light for the next color period, and then to pass blue light for the last color period.

Alternatively, if the color sequential filter 30 is a rotating disk of three filters, the color period counter to the multiplexer 65A is synchronized such that the red color capacitor RCA is coupled to the comparator 64A when the red filter is in place, and the same for the green and the blue color capacitors GCA and BCA. In any case, it will be appreciated that a variety of methods of synchronizing the color sequential filter 30 with the selected capacitors RCA, GCA, or BCA will be available, and are not critical to the invention. Further, it should be noted that the color period rate need not be coupled to the frame rate—they can be asynchronous, with changes in one rate not affecting the other. This allows the color period to be short—frequencies of over 600 Hz independent of the video controller frame rate. This is desirable because it reduces adverse effects often present in color sequential systems, such as rainbows and color bursts when one turns their head.

Figure 8:
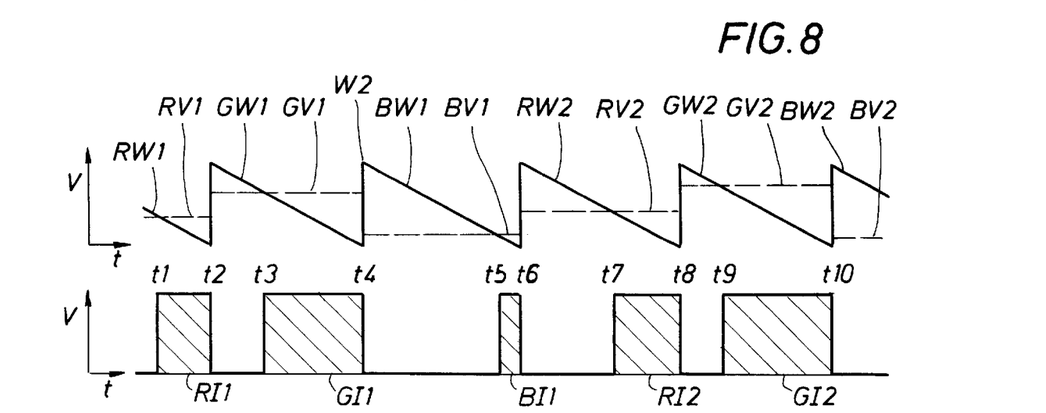
FIG. 8 shows how analog voltage signals are converted into voltage inputs for the FLCs.

As illustrated in FIG. 8, the voltage comparator circuit 64A compares, during the first color period, the voltage RV1 on the capacitor RCA to the portion RW1 of the sawtooth waveform W2. During the second color period, the voltage comparator circuit 64A compares the voltage GV1 on the capacitor GCA to the portion GW1 of the sawtooth waveform W2. During the third color period, the voltage comparator circuit 64A compares the voltage BV1 on the capacitor BCA to the portion BW1 of the sawtooth waveform W2.

This sequence is continuously repeated. During the fourth color period, the voltage RV2 on the capacitor RCA is compared to the portion RW2 of the sawtooth waveform W2 by voltage comparator circuit 64A. During the fifth color period, the voltage GV2 on the capacitor GCA is compared to the portion GW2 of the sawtooth waveform W2 by voltage comparator circuit 64A. During the sixth color period, the voltage BV2 on the capacitor BCA is compared to the portion BW2 of the sawtooth waveform W2 by voltage comparator circuit 64A.

During that portion of the first color period that the voltage of waveform W2 exceeds voltage RV1, the output voltage of comparator circuit is zero, and FLCD 63A is off (non-transmissive). During that portion of the first color period that the voltage of waveform W2 is less than voltage RV1 (from t1 to t2), the output voltage of comparator circuit is sufficient to turn on FLCD 63A, and thus FLCD 63A is transmissive. Thus, during the first color period, FLCD 63A will be on, transmitting red light, for the amount of time represented by block RI1 in FIG. 8 (t2–t1). The voltage GV1 on the capacitor GCA during the second color period is higher than the voltage RV1, and thus FLCD 63A will be on for a longer time period (from t3 to t4—see block GI1) transmitting green light than it was transmitting red light. For the next color period, blue light will be transmitted through FLCD 63A for only a brief period (from t5 to t6—see block BI1) because the voltage BV1 is so small. A person watching the screen 111 of the computer monitor 110 during the first three color periods would perceive a color transmitting from pixel 60A which is a mixture of red light, about twice as much green light, and about a third as much blue light.

In like manner, FLCD 63A will be on during the fourth, fifth, and sixth color periods from time t7 to time t8 (as indicated by block RI2, during which time it will transmit red light), from time t9 to time t10 (as indicated by block GI2 in FIG. 8), and for a relatively short period of time (not shown) transmitting blue light.

Sawtooth waveform W2 is shown to be falling sawtooth wave. The FLCD control electronics of the present invention will likewise work with a rising sawtooth wave W1 (see FIG. 9), an alternating sawtooth wave W3, a gamma corrected (non-linear) waveform W4 (to compensate for the fact that the difference between no light at all during a frame duration and light for a short amount of time during the frame duration is greater than the difference between light during all of the frame duration and light during all of the frame duration except for the short amount of time), a waveform W5 in which the gamma correction for each color of light is different, and a waveform W6 with a relaxation period represented by a flat portion at the top of the waveform where the FLCD 63A is always off, regardless of the voltage on the relevant capacitor.

Figure 9:
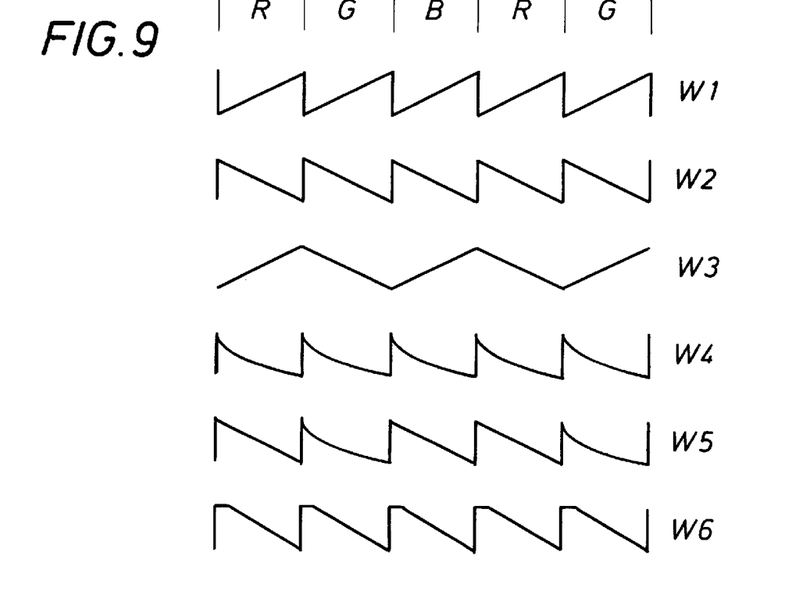
FIG. 9 shows various waveforms which can be used with the system of the present invention.

Further, it is preferable that the lowest voltage on the sawtooth waveforms W1–6 is slightly higher than the lowest voltage that could be held by the capacitors RCA, GCA, and BCA. This ensures that if the output of the video controller is to assume a fall off pixel valve, no light is transmitted by that pixel.

The waveform generator 67 could be of a variety of types of waveform generators, including a waveform generator that uses a digital/analog convertor that can be programmed by the computer system. In this way, the waveform put out by the waveform generator can be dynamically altered, resulting in different gamma corrections.

Figure 10:
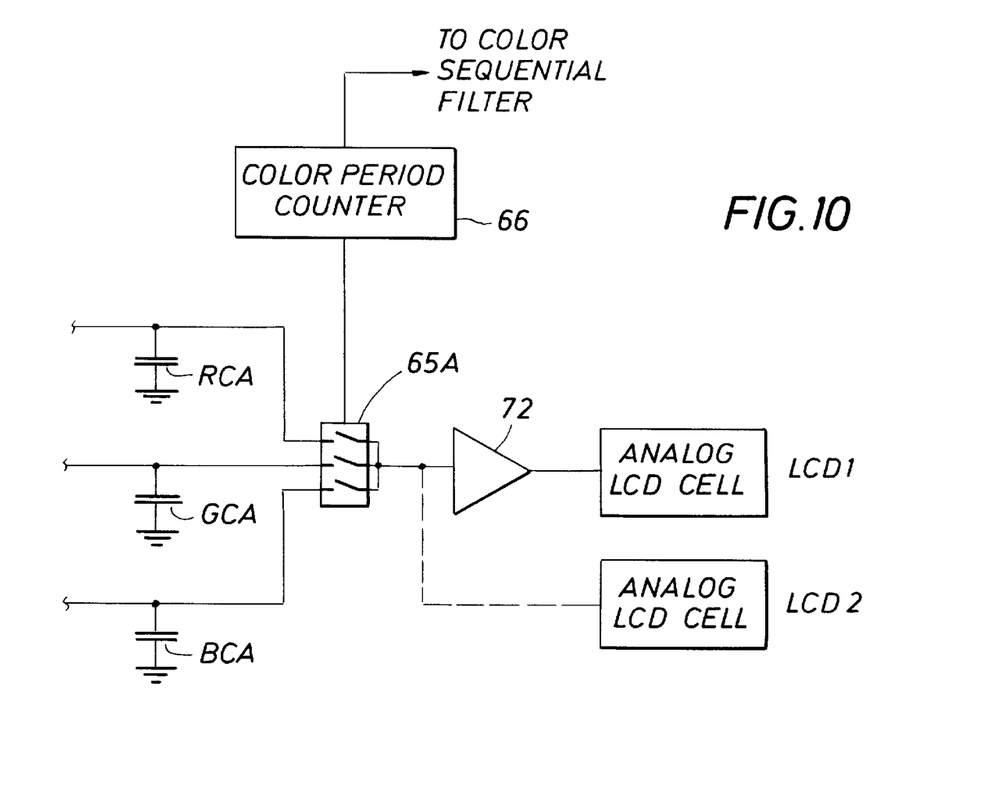
FIG. 10 shows an alternative embodiment for providing field sequential color using analog LCDs.

Turning to FIG. 10, an additional embodiment according to the invention is shown. The system can be adapted for use with analog LCD cells, such as the LCD cell LCD1 or LCD2. These cells are different from the FLCD's in that they are responsive to voltage levels, and not strictly on/off. According to the invention, the color period counter 66 can clock the multiplexer 65A to again select the capacitors RCA, GCA, and BCA in sequence, but in this case it is not necessary to provide the waveform generator 67 nor the comparator 64A. Instead, illustrated is an amplifier 72 which has a high input impedance so as not to discharge the capacitors RCA, GCA, and BCA. The amplifier 72 in turn drives an analog LCD cell LCD1, which sequentially assumes the correct transmissivity as specified by the capacitors RCA, GCA, and GCA as illustrated in FIG. 7. Alternatively, the amplifier 72 can be eliminated if the clock rate is sufficiently high and the resulting signal directly provided to an analog LCD cell LCD2. In this way, a single LCD cell is used for a color sequential display while a standard output from a video controller can be used to provide the analog voltage levels for the capacitors RCA, GCA, and BCA.

Although the invention has been described with a transmissive LCD panel, the panel controller of the present invention could be used with a reflective LCD panel, such as that disclosed in the DisplayTech paper mentioned above.

The foregoing embodiments are presented by way of example only; the scope of the present invention is to be limited only by the following claims.

What is claimed is:

1. A display apparatus comprising:
    a plurality of ferroelectric liquid crystal display pixels;
    a controller for each ferroelectric liquid crystal display (FLCD) pixel, each controller including:
        a first storage device for storing an analog voltage signal corresponding to a first color of light to be emitted from the pixel during a video frame;
        a second storage device for storing an analog voltage signal corresponding to a second color of light to be emitted from the pixel during a video frame;
        a third storage device for storing an analog voltage signal corresponding to a third color of light to be emitted from the pixel during a video frame;
        a comparator device for sequentially comparing the analog voltage signals to a voltage input signal, the comparator device having an output signal which is fed to the ferroelectric liquid crystal display pixel;
    a voltage input signal generator providing the voltage input signal;
    means for sequentially selecting the first, second, and third storage devices of each controller for the FLCD pixels;
    a light source; and
    a filter for sequentially selecting different colors of light.

2. The display apparatus of claim 1, further comprising: a video controller for providing the input video signal.

3. The display apparatus of claim 1, wherein said storage devices are capacitors.

4. The display apparatus of claim 1, wherein the means for sequentially selecting the first, second, and third storage devices of each controller for the FLCD pixels comprises a multiplexer.

5. The display apparatus of claim 1, wherein said filter is a rotating disk with red, green, and blue filters.

6. The display apparatus of claim 1, wherein said filter is a digitally switched filter.

7. The display apparatus of claim 1, said filter is a reflective filter.

8. The display apparatus of claim 1, wherein the plurality of pixels is located between the light source and the display.

9. The display apparatus of claim 1, wherein the voltage input signal comprises a falling sawtooth signal.

10. The display apparatus of claim 1, wherein the voltage input signal comprises a gamma-corrected sawtooth signal.

11. The display apparatus of claim 1, wherein the voltage input signal comprises a sawtooth signal having a different gamma-corrected waveform corresponding to each light color.

12. The display apparatus of claim 1 further comprising:
   three analog switches coupled to said storage devices and receiving red, green, and blue analog signals, wherein said switches pass said red, green, and blue analog signals responsive to a decoded row column address corresponding to the pixel.

13. The display apparatus of claim 1, wherein the ferroelectric liquid crystal display pixels are provided by a ferroelectric liquid crystal display with a reflective surface, wherein the controller for each pixel is located beneath the reflective surface as part of an integrated surface.

14. The display apparatus of claim 1, wherein the frequency of the voltage signal is at least about 600 Hz.

* * * * *